(12) United States Patent
Lee et al.

(10) Patent No.: US 9,871,269 B2
(45) Date of Patent: Jan. 16, 2018

(54) ELECTROLYTE AND RECHARGEABLE LITHIUM BATTERY INCLUDING SAME

(71) Applicant: Samsung SDI Co., Ltd., Yongin-si, Gyeonggi-do (KR)

(72) Inventors: Min-Young Lee, Yongin-si (KR); Ho-Seok Yang, Yongin-si (KR); Yun-Hee Kim, Yongin-si (KR); Young Sam Park, Yongin-si (KR); Jin-Hyeok Lim, Yongin-si (KR); Hee-Yeon Hwang, Yongin-si (KR); Hyun-Woo Kim, Yongin-si (KR); Se-Jeong Park, Yongin-si (KR)

(73) Assignee: SAMSUNG SDI CO., LTD., Yongin-si, Gyeonggi-do (KR)

( * ) Notice: Subject to any disclaimer, the term of this patent is extended or adjusted under 35 U.S.C. 154(b) by 342 days.

(21) Appl. No.: 14/605,869

(22) Filed: Jan. 26, 2015

(65) Prior Publication Data
US 2015/0244029 A1 Aug. 27, 2015

(30) Foreign Application Priority Data

Feb. 24, 2014 (KR) ........................ 10-2014-0021433

(51) Int. Cl.
*H01M 10/0567* (2010.01)
*H01M 10/0568* (2010.01)
*H01M 10/0569* (2010.01)
*H01M 10/0525* (2010.01)

(52) U.S. Cl.
CPC ... *H01M 10/0567* (2013.01); *H01M 10/0568* (2013.01); *H01M 10/0569* (2013.01); *H01M 10/0525* (2013.01); *H01M 2300/0025* (2013.01)

(58) Field of Classification Search
CPC ......... H01M 10/0567; H01M 10/0568; H01M 10/0569; H01M 10/0525; H01M 2300/0025
See application file for complete search history.

(56) References Cited

U.S. PATENT DOCUMENTS

| 2005/0170258 A1* | 8/2005 | Kawakami | ........ H01M 10/0567 |
| | | | 429/330 |
| 2009/0017386 A1 | 1/2009 | Xu et al. | |
| 2014/0272606 A1* | 9/2014 | Chu | .................. H01M 10/0567 |
| | | | 429/332 |
| 2015/0364794 A1* | 12/2015 | Nakazawa | ............ H01M 4/587 |
| | | | 429/200 |

FOREIGN PATENT DOCUMENTS

| KR | 10-2004-0061562 A | 7/2004 |
| KR | 10-2008-0087341 A | 10/2008 |
| KR | 10-2012-0018569 A | 3/2012 |
| WO | WO 2014133107 | * 9/2014 |

* cited by examiner

*Primary Examiner* — Laura Weiner
(74) *Attorney, Agent, or Firm* — Knobbe, Martens, Olson & Bear, LLP

(57) ABSTRACT

Disclosed are an electrolyte for a rechargeable lithium battery including a lithium salt, a non-aqueous organic solvent, and an additive represented by the following Chemical Formula 1, and a rechargeable lithium battery including the same.

[Chemical Formula 1]

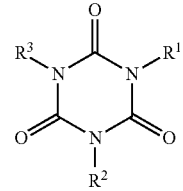

Definition of Chemical Formula 1 is the same as described in the detailed description.

10 Claims, 1 Drawing Sheet

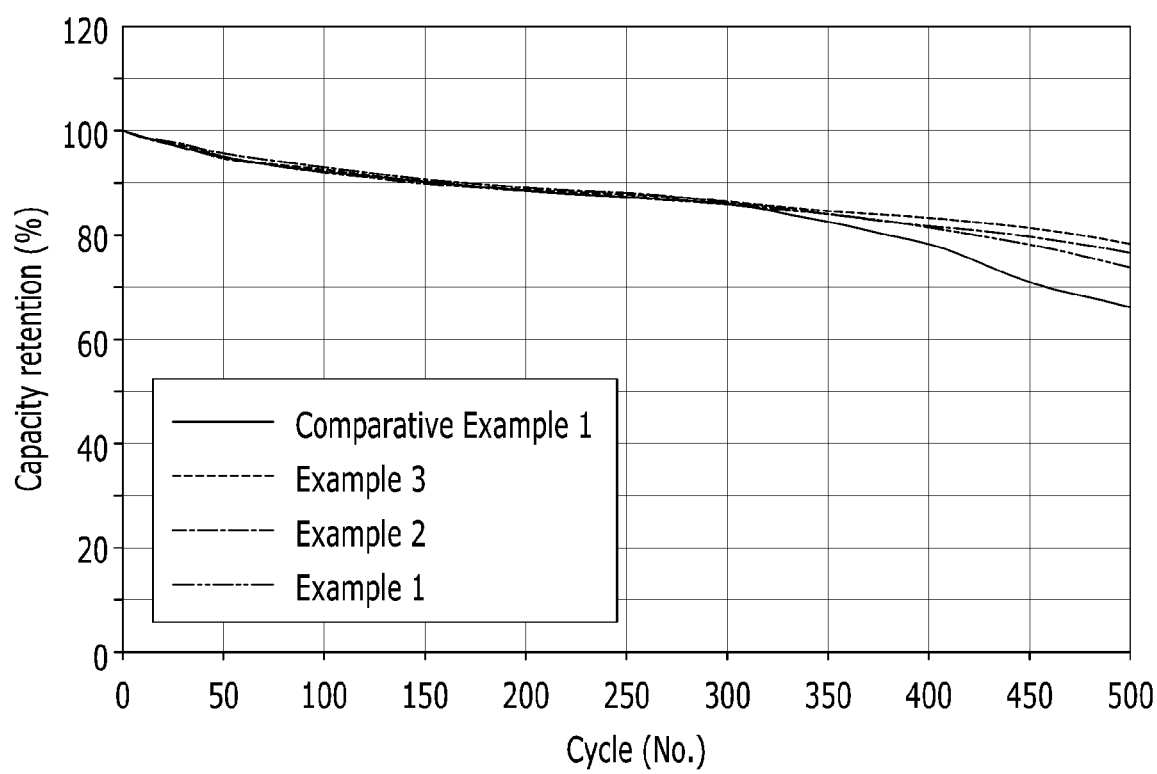

ELECTROLYTE AND RECHARGEABLE LITHIUM BATTERY INCLUDING SAME

CROSS-REFERENCE TO RELATED APPLICATION

This application claims priority to and the benefit of Korean Patent Application No. 10-2014-0021433 filed in the Korean Intellectual Property Office on Feb. 24, 2014, the entire contents of which are incorporated herein by reference.

BACKGROUND

1. Field

An electrolyte for a rechargeable lithium battery and a rechargeable lithium battery including the same are disclosed.

2. Description of the Related Art

Charges are moved by electrons in an external electrical conductor during charge and discharge of a rechargeable lithium battery but by lithium ions between electrically separated positive and negative electrodes. An electrolyte for a rechargeable lithium battery may be defined as medium through which ion movement is performed.

The electrolyte may include a functional additive, and the functional additive is included in a small amount of several %'s based on the total amount of the electrolyte and thus, may not largely change properties of the electrolyte, and include various compounds. The functional additive may be various but classified into two types based on the operation mechanism.

The first type of the functional additive has an influence on interface characteristics between electrode and electrolyte and plays a role of forming a protection layer through an electrochemical or physical/chemical reaction or adsorption on the surface of a positive or negative electrode and suppressing battery deterioration or improving safety and the like.

The second type of the functional additive improves characteristics of an electrolyte itself and directly works on a solvent or a lithium salt and plays a role of increasing stability or ion conductivity or removing impurities impeding stability of the electrolyte (moisture, HF, and other byproducts). In general, main characteristics (energy/power, cycle-life, safety, and the like) of a rechargeable lithium battery is primarily determined by positive and negative electrodes. However, these characteristics may be realized by using an appropriate electrolyte and maximized by selecting an optimal electrolyte composition.

A conventional carbonate-based electrolyte for a rechargeable lithium battery is oxidized at a much higher voltage than operation potential of most positive electrode materials. Accordingly, the electrolyte is hardly oxidized under a normal charge and discharge condition which is no extreme condition such as exposure of a battery to a high temperature, its overcharge, and the like. However, recent research results show that decomposition byproducts of the electrolyte are present on the surface of the positive electrode.

These electrolyte decomposition byproducts may be produced by a chemical reaction but mostly by an electrochemical oxidation reaction of the electrolyte. The oxidization of the electrolyte on the positive electrode during normal charge and discharge is regarded as a local voltage increase or temperature increase of the positive electrode. In particular, sharply-increased impedance of a positive electrode rather than a negative electrode generally deteriorates cycle-life as the repeated charge and discharge cycles, and herein, the impedance is known to be mainly increased when byproducts due to oxidation of the electrolyte are piled up on the surface of the positive electrode. The surface change rather than bulk characteristics of the positive electrode is known to be mainly deteriorate battery performance, and accordingly, many attempts have been made to control surface reactivity by modifying the surface of the positive electrode.

Development of an electrolyte having low chemical or electrochemical reactivity with the positive electrode is needed. However, some degrees of reactivity with the positive electrode is preferable in terms of safety. The large amount of byproducts on the surface of the positive electrode may deteriorate battery performance, but appropriate amount of the byproducts may contribute to safety of the positive electrode.

SUMMARY

One embodiment provides an electrolyte for a rechargeable lithium battery suppressed from a side reaction with an electrode and realizing excellent stability and room temperature cycle-life characteristics.

Another embodiment provides a rechargeable lithium battery including the same.

In one embodiment, provided is an electrolyte including a lithium salt, a non-aqueous organic solvent, and an additive represented by the following Chemical Formula 1.

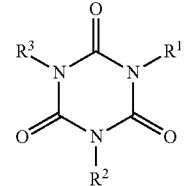

[Chemical Formula 1]

In the above Chemical Formula 1, $R^1$ to $R^3$ are the same or different, and are independently hydrogen, a substituted or unsubstituted C1 to C10 alkyl group, a substituted or unsubstituted C1 to C10 alkenyl group, a substituted or unsubstituted C3 to C20 cycloalkyl group, a substituted or unsubstituted C3 to C20 cycloalkenyl group, a substituted or unsubstituted C6 to C30 aryl group, or a substituted or unsubstituted C2 to C30 heteroaryl group, and at least one of $R^1$ to $R^3$ are a substituted or unsubstituted C1 to C10 alkenyl group, or a substituted or unsubstituted C3 to C20 cycloalkenyl group.

Specifically, in the above Chemical Formula 1, at least one of $R^1$ to $R^3$ may be a substituted or unsubstituted C1 to C10 alkenyl group, and the alkenyl group may include a carbon-carbon double bond at the terminal end.

The additive represented by the above Chemical Formula 1 may be included in an amount of about 0.01 wt % to about 3 wt % based on the total amount of the electrolyte.

The electrolyte may further include fluoroethylene carbonate.

The fluoroethylene carbonate may be included in an amount of about 0.1 wt % to about 10 wt % based on the total amount of the electrolyte.

The electrolyte may further include lithium tetrafluoro borate.

The lithium tetrafluoro borate may be included in an amount of about 0.01 wt % to about 2 wt % based on the total amount of the electrolyte.

The lithium salt may include LiPF$_6$, LiBF$_4$, LiSbF$_6$, LiAsF$_6$, LiC$_4$F$_9$SO$_3$, LiClO$_4$, LiAlO$_2$, LiAlCl$_4$, LiN(C$_x$F$_{2x+1}$SO$_2$)(C$_y$F$_{2y+1}$SO$_2$), x and y are natural numbers, LiCl, LiI, or a combination thereof.

A concentration of the lithium salt may be about 0.1 M to about 2.0 M.

The non-aqueous organic solvent may include a carbonate-based, ester-based, ether-based, ketone-based, alcohol-based, aprotic solvent or a combination thereof.

In another embodiment, a rechargeable lithium battery including the electrolyte, a positive electrode, and a negative electrode is provided.

The electrolyte for a rechargeable lithium battery according to one embodiment has a small side reaction with an electrode, and thus, provides a rechargeable lithium battery including the same has excellent safety and room temperature cycle-life characteristics.

BRIEF DESCRIPTION OF THE DRAWING

FIG. 1 is a graph showing room temperature cycle-life characteristics of batteries according to Example and Comparative Example.

DETAILED DESCRIPTION

Example embodiments will hereinafter be described in detail, and may be easily performed by those who have common knowledge in the related art. However, this disclosure may be embodied in many different forms and is not construed as limited to the example embodiments set forth herein.

As used herein, when a definition is not otherwise provided, the term 'substituted' refers to one substituted with a substituent selected from a halogen atom (F, Br, Cl or I), a hydroxy group, an alkoxy group, a nitro group, a cyano group, an amino group, an azido group, an amidino group, a hydrazino group, a hydrazono group, a carbonyl group, a carbamyl group, a thiol group, an ester group, a carboxyl group or a salt thereof, a sulfonic acid group or a salt thereof, a phosphoric acid or a salt thereof, a C1 to C20 alkyl group, a C2 to C20 alkenyl group, a C2 to C20 alkynyl group, a C6 to C30 aryl group, a C7 to C30 arylalkyl group, a C1 to C4 alkoxy group, a C1 to C20 heteroalkyl group, a C3 to C20 heteroarylalkyl group, a C3 to C30 cycloalkyl group, a C3 to C15 cycloalkenyl group, a C6 to C15 cycloalkynyl group, a C2 to C20 heterocycloalkyl group, and a combination thereof, instead of hydrogen of a compound.

As used herein, when a definition is not otherwise provided, the term 'hetero' refers to one including 1 to 3 hetero atoms selected from N, O, S, and P.

In one embodiment, provided is an electrolyte including a lithium salt, a non-aqueous organic solvent, and an additive represented by the following Chemical Formula 1.

[Chemical Formula 1]

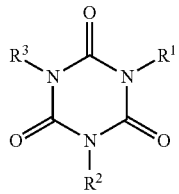

In the above Chemical Formula 1, R$^1$ to R$^3$ are the same or different, and are independently hydrogen, a substituted or unsubstituted C1 to C10 alkyl group, a substituted or unsubstituted C1 to C10 alkenyl group, a substituted or unsubstituted C3 to C20 cycloalkyl group, a substituted or unsubstituted C3 to C20 cycloalkenyl group, a substituted or unsubstituted C6 to C30 aryl group, or a substituted or unsubstituted C2 to C30 heteroaryl group, at least one of R$^1$ to R$^3$ are a substituted or unsubstituted C1 to C10 alkenyl group, or a substituted or unsubstituted C3 to C20 cycloalkenyl group.

At least one of R$^1$ to R$^3$ may be a substituent including a carbon-carbon double bond.

The electrolyte for a rechargeable lithium battery may be suppressed from a side reaction with a positive electrode and improve cycle-life characteristics of a battery.

In the above Chemical Formula 1, at least one of R$^1$ to R$^3$ may be a substituted or unsubstituted C1 to C10 alkenyl group. For example, R$^1$ to R$^3$ may be independently a substituted or unsubstituted C1 to C10 alkenyl group. Herein, the electrolyte for a rechargeable lithium battery may suppress a side reaction with an electrode effectively, and thus improve cycle-life characteristics of a battery.

The C1 to C10 alkenyl group may be, for example an ethenyl group (ethylene group), a propenyl group, a butenyl group, a propenyl group, a hexenyl group, and the like.

The alkenyl group may include a carbon-carbon double bond at the terminal end. For example, at least one of R$^1$ to R$^3$ may be a 2-propenyl group (allyl group), a 3-butenyl group, a 4-propenyl group, and the like.

In the above Chemical Formula 1, the C1 to C10 alkyl group may be specifically a C1 to C5 alkyl group, and the C1 to C10 alkenyl group may be a C1 to C5 alkenyl group. The C3 to C20 cycloalkyl group may be a C3 to C10 cycloalkyl group, and the C3 to C20 cycloalkenyl group may be a C3 to C10 cycloalkenyl group. In addition, the C6 to C30 aryl group may be specifically a C6 to C20 arylene group, a C6 to C15 aryl group, and the like. The C2 to C30 heteroaryl group may be specifically a C2 to C20 heteroaryl group, a C2 to C15 heteroaryl group, and the like.

The additive represented by the above Chemical Formula 1 may be included in an amount of about 0.01 wt % to about 3 wt %, specifically about 0.01 wt % to about 2.5 wt %, about 0.01 wt % to about 2 wt %, about 0.01 wt % to about 1.5 wt %, about 0.01 wt % to about 1 wt %, or about 0.1 wt % to about 1 wt % based on the total amount of the electrolyte for a rechargeable lithium battery. Herein, the electrolyte for a rechargeable lithium battery may suppress a side reaction with an electrode effectively, and thus improve cycle-life characteristics of a battery.

The electrolyte may further include fluoroethylene carbonate (FEC). Herein, the electrolyte may suppress a side reaction with an electrode effectively, and thus improve cycle-life characteristics of a battery.

The fluoroethylene carbonate may be included in an amount of about 0.1 wt % to about 10 wt %, specifically about 0.1 wt % to about 9 wt %, about 0.1 wt % to about 8 wt %, about 0.1 to about 7 wt %, about 0.1 wt % to about 6 wt %, about 0.1 wt % to about 5 wt %, about 0.1 wt % to about 4 wt %, about 1 wt % to about 10 wt %, or about 1 wt % to about 5 wt % based on the total amount of the electrolyte for a rechargeable lithium battery. Herein, the electrolyte for a rechargeable lithium battery may suppress a side reaction with an electrode effectively, and thus improve cycle-life characteristics of a battery.

The electrolyte may further include lithium tetrafluoro borate (LiBF$_4$). Herein, the electrolyte for a rechargeable lithium battery may suppress a side reaction with an electrode effectively, and thus improve cycle-life characteristics of a battery.

The lithium tetrafluoro borate may be included in an amount of about 0.01 wt % to about 2 wt %, specifically about 0.01 wt % to about 1 wt %, about 0.01 wt % to about 0.5 wt %, about 0.1 wt % to about 2 wt %, or about 0.1 wt % to about 1 wt % based on the total amount of the electrolyte for a rechargeable lithium battery. Herein, the electrolyte for a rechargeable lithium battery may suppress a side reaction with an electrode effectively, and thus improve cycle-life characteristics of a battery.

The lithium salt is dissolved in an organic solvent, supplies lithium ions in a battery, operates a basic operation of the rechargeable lithium battery, and improves lithium ion transportation between positive and negative electrodes therein.

The lithium salt may include $LiPF_6$, $LiBF_4$, $LiSbF_6$, $LiAsF_6$, $LiC_4F_9SO_3$, $LiClO_4$, $LiAlO_2$, $LiAlCl_4$, $LiN(C_xF_{2x+1}SO_2)(C_yF_{2y+1}SO_2)$, x and y are natural numbers, LiCl, LiI, or a mixture thereof, but is not limited thereto.

The lithium salt may be used in a concentration from about 0.1 M to 2.0 M. When the lithium salt is included at the above concentration range, an electrolyte may have excellent performance and lithium ion mobility due to optimal electrolyte conductivity and viscosity.

The non-aqueous organic solvent serves as a medium for transmitting ions taking part in the electrochemical reaction of a battery.

The non-aqueous organic solvent may be a carbonate-based, ester-based, ether-based, ketone-based, alcohol-based, aprotic solvent or a combination thereof.

The carbonate-based solvent may be dimethyl carbonate (DMC), diethyl carbonate (DEC), dipropyl carbonate (DPC), methylpropyl carbonate (MPC), ethylpropyl carbonate (EPC), ethylmethyl carbonate (EMC), ethylene carbonate (EC), propylene carbonate (PC), butylene carbonate (BC), and the like.

For example, the carbonate based solvent may be prepared by combining ethylene carbonate (EC), ethylmethyl carbonate (EMC), and dimethyl carbonate (DMC), and herein, the ethylene carbonate (EC) may be used in an amount of greater than or equal to about 20 wt % and specifically, about 20 to about 90 wt % based on the total amount of the non-aqueous organic solvent. When the ethylene carbonate (EC) was included within the range, ion conductivity may be improved due to increase of a dielectric constant.

The ester-based solvent may be methyl acetate, ethyl acetate, n-propyl acetate, dimethyl acetate, methyl propionate, ethyl propionate, gamma-butyrolactone, decanolide, gamma-valerolactone, mevalonolactone, caprolactone, and the like.

The ether-based solvent may be dibutyl ether, tetraglyme, diglyme, dimethoxyethane, 2-methyltetrahydrofuran, tetrahydrofuran, and the like, and the ketone-based solvent may be cyclohexanone, and the like.

In addition, the alcohol-based solvent may be ethanol, isopropyl alcohol, and the like. The aprotic solvent may include nitriles such as R—CN (wherein R is a C2 to C20 linear, branched, or cyclic hydrocarbon group, and may include a double bond, an aromatic ring, or an ether bond), amides such as dimethylformamide, dioxolanes such as 1,3-dioxolane, sulfolanes, and the like.

The non-aqueous organic solvent may be used singularly or in a mixture. When the organic solvent is used in a mixture, the mixture ratio may be controlled in accordance with a desirable battery performance.

The carbonate-based solvent is prepared by mixing a cyclic carbonate and a linear carbonate. The cyclic carbonate and the linear carbonate are mixed together in the volume ratio of about 1:1 to about 1:9. Within this range, performance of electrolyte may be improved.

The non-aqueous organic solvent of the present embodiments includes an aromatic hydrocarbon-based organic solvent as well as the carbonate based solvent. The carbonate-based and the aromatic hydrocarbon-based solvents may be mixed together in a volume ratio from about 1:1 to about 30:1.

Specific examples of the aromatic hydrocarbon-based organic solvent may be selected from benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 2,3-difluorotoluene, 2,4-difluorotoluene, 2,5-difluorotoluene, 2,3,4-trifluorotoluene, 2,3,5-trifluorotoluene, chlorotoluene, 2,3-dichlorotoluene, 2,4-dichlorotoluene, 2,5-dichlorotoluene, 2,3,4-trichlorotoluene, 2,3,5-trichlorotoluene, iodotoluene, 2,3-diiodotoluene, 2,4-diiodotoluene, 2,5-diiodotoluene, 2,3,4-triiodotoluene, 2,3,5-triiodotoluene, xylene, and a combination thereof.

In one embodiment, the non-aqueous organic solvent may include ethylene carbonate, ethylmethyl carbonate, dimethyl carbonate, diethyl carbonate, dipropyl carbonate, methylpropyl carbonate, ethylpropyl carbonate, propylene carbonate, butylene carbonate, or a combination thereof.

In another embodiment, a rechargeable lithium battery including the electrolyte, a positive electrode, and a negative electrode is provided.

The rechargeable lithium battery may be classified into a lithium ion battery, a lithium ion polymer battery, and a lithium polymer battery depending on kinds of a separator and an electrolyte. It also may be classified to be cylindrical, prismatic, coin-type, pouch-type, and the like depending on shape. In addition, it may be bulk type and thin film type depending on size. Structures and manufacturing methods for lithium ion batteries pertaining to this disclosure are well known in the art.

The rechargeable lithium battery includes a negative electrode, a positive electrode, and a separator interposed between the negative electrode and the positive electrode, an electrolyte impregnating the negative electrode, the positive electrode, and the separator, a battery case, and a sealing member sealing the battery case. The rechargeable lithium battery is manufactured by sequentially stacking the negative electrode, positive electrode, and separator, and spiral-winding them and housing the wound resultant in the battery case.

The positive electrode includes a current collector and a positive active material layer formed on the current collector.

The current collector may be Al, but is not limited thereto.

The positive active material layer includes a positive active material, a binder, and optionally a conductive material.

The positive active material may include lithiated intercalation compounds that reversibly intercalate and deintercalate lithium ions. Specifically, at least one composite oxide of lithium and a metal of cobalt, manganese, nickel, or a combination thereof may be used, and specific examples thereof may be a compound represented by one of the following chemical formulae. $Li_aA_{1-b}R_bD_2$ ($0.90 \leq a \leq 1.8$, $0 \leq b \leq 0.5$); $Li_aE_{1-b}R_bO_{2-c}D_c$ ($0.90 \leq a \leq 1.8$, $0 \leq b \leq 0.5$ and $0 \leq c \leq 0.05$); $Li_aE_{2-b}R_bO_{4-c}D_c$ ($0.90 \leq a \leq 1.8$, $0 \leq b \leq 0.5$, $0 \leq c \leq 0.05$); $Li_aNi_{1-b-c}Co_bR_cD_\alpha$ ($0.90 \leq a \leq 1.8$, $0 \leq b \leq 0.5$, $0 \leq c \leq 0.05$ and $0 < \alpha \leq 2$); $Li_aNi_{1-b-c}Co_bR_cO_{2-\alpha}Z_\alpha$ ($0.90 \leq a \leq 1.8$, $0 \leq b \leq 0.5$, $0 \leq c \leq 0.05$ and $0 < \alpha \leq 2$); $Li_aNi_{1-b-c}Co_bR_cO_{2-\alpha}Z_2$ ($0.90 \leq a \leq 1.8$, $0 \leq b \leq 0.5$, $0 \leq c \leq 0.05$ and $0 < \alpha < 2$); $Li_aNi_{1-b-c}Mn_bR_cD_\alpha$ ($0.90 \leq a \leq 1.8$, $0 \leq b \leq 0.5$, $0 \leq c \leq 0.05$ and $0 < \alpha \leq 2$); $Li_aNi_{1-b-c}Mn_bR_cO_{2-\alpha}Z_\alpha$ ($0.90 \leq a \leq 1.8$, $0 \leq b \leq 0.5$, $0 \leq c \leq 0.05$ and $0 < \alpha \leq 2$); $Li_aNi_{1-b-c}Mn_bR_cO_{2-\alpha}Z_\alpha$ ($0.90 \leq a \leq 1.8$, $0 \leq b \leq 0.5$, $0 \leq c \leq 0.05$ and $0 < \alpha < 2$); $Li_aNi_bE_cG_dO_2$ ($0.90 \leq a \leq 1.8$, $0 \leq b \leq 0.9$, $0 \leq c \leq 0.5$ and $0.001 \leq d \leq 0.1$); $Li_aNi_bCo_cMn_dG_eO_2$ ($0.90 \leq a \leq 1.8$, $0 \leq b \leq 0.9$, $0 \leq c \leq 0.5$, $0 \leq d \leq 0.5$ and $0.001 \leq e \leq 0.1$); $Li_aNiG_bO_2$ ($0.90 \leq a \leq 1.8$ and $0.001 \leq b \leq 0.1$); $Li_aCoG_bO_2$ ($0.90 \leq a \leq 1.8$ and $0.001 \leq b \leq 0.1$); $Li_aMnG_bO_2$ ($0.90 \leq a \leq 1.8$ and $0.001 \leq b \leq 0.1$); $Li_aMn_2G_bO_4$ ($0.90 \leq a \leq 1.8$ and $0.001 \leq b \leq 0.1$); $QO_2$; $QS_2$; $LiQS_2$; $V_2O_5$; $LiV_2O_5$; $LiTO_2$; $LiNiVO_4$; $Li_{(3-f)}J_2(PO_4)_3$ ($0 \leq f \leq 2$); $Li_{(3-f)}Fe_2(PO_4)^3$ ($0 \leq f \leq 2$); and $LiFePO_4$.

In the above Chemical Formulae, A is Ni, Co, Mn, or a combination thereof; R is Al, Ni, Co, Mn, Cr, Fe, Mg, Sr, V, a rare earth element, or a combination thereof; D is O, F, S, P, or a combination thereof; E is Co, Mn, or a combination thereof; Z is F, S, P, or a combination thereof; G is Al, Cr, Mn, Fe, Mg, La, Ce, Sr, V, or a combination thereof; Q is Ti, Mo, Mn, or a combination thereof; T is Cr, V, Fe, Sc, Y, or a combination thereof; and J is V, Cr, Mn, Co, Ni, Cu, or a combination thereof.

The binder improves binding properties of positive active material particles with one another and with a current collector. Examples thereof may be polyvinyl alcohol, carboxylmethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but are not limited thereto.

The conductive material improves conductivity of an electrode. Any electrically conductive material may be used as a conductive material, unless it causes a chemical change. Examples thereof may be one or more mixtures of natural graphite, artificial graphite, carbon black, acetylene black, ketjen black, a carbon fiber, copper, a metal powder, a metal fiber, and the like of nickel, aluminum, silver, and the like, a conductive material of a polyphenylene derivative, and the like.

The negative electrode includes a current collector and a negative active material layer formed on the current collector.

The current collector may be a copper foil, a nickel foil, a stainless steel foil, a titanium foil, a nickel foam, a copper foam, a polymer substrate coated with a conductive metal, or a combination thereof.

The negative active material layer includes a negative active material, a binder, and optionally a conductive material.

The negative active material may include a material that reversibly intercalates/deintercalates lithium ions, lithium metal, lithium metal alloy, material being capable of doping and dedoping lithium, or transition metal oxide.

The material that reversibly intercalates/deintercalates lithium ions can be a carbon material, and may be any generally-used carbon-based negative active material in a rechargeable lithium ion battery, and examples thereof may be crystalline carbon, amorphous carbon, or a combination thereof. Examples of the crystalline carbon may be a graphite such as a shapeless, sheet-shaped, flake, spherical shaped or fiber-shaped natural graphite or artificial graphite, and examples of the amorphous carbon may be soft carbon or hard carbon, a mesophase pitch carbonized product, fired cokes, and the like.

In particular, the soft carbon has higher power characteristics and is charged for a shorter time than graphite or hard carbon but still has low price and high stability and thus, may be appropriately used for a large capacity battery such as an ISG battery for a vehicle.

The lithium metal alloy may include an alloy of lithium and a metal of Na, K, Rb, Cs, Fr, Be, Mg, Ca, Sr, Si, Sb, Pb, In, Zn, Ba, Ra, Ge, Al, or Sn.

The material being capable of doping and dedoping lithium may be Si, $SiO_x$ ($0<x<2$), a Si—C composite, a Si-Q alloy (wherein Q is an alkali metal, an alkaline-earth metal, Group 13 to 16 elements, a transition metal, a rare earth element, or a combination thereof, and not Si), Sn, $SnO_2$, a Sn—C composite, Sn—R (wherein R is an alkali metal, an alkaline-earth metal, Group 13 to 16 elements, a transition metal, a rare earth element, or a combination thereof, and not Sn), and the like. Specific examples of the Q and R may be Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Tl, Ge, P, As, Sb, Bi, S, Se, Te, Po, or a combination thereof.

The transition metal oxide may be vanadium oxide, lithium vanadium oxide, and the like.

The binder improves binding properties of negative active material particles with one another and with a current collector. Examples thereof may be polyvinyl alcohol, carboxylmethyl cellulose, hydroxypropyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, styrene-butadiene rubber, an acrylated styrene-butadiene rubber, an epoxy resin, nylon, and the like, but are not limited thereto.

The conductive material improves conductivity of an electrode. Any electrically conductive material may be used as a conductive material, unless it causes a chemical change. Examples thereof may be a carbon-based material such as natural graphite, artificial graphite, carbon black, acetylene black, ketjen black, a carbon fiber, and the like; a metal-based material of a metal powder or a metal fiber including copper, nickel, aluminum, silver, and the like; a conductive polymer such as a polyphenylene derivative and the like; or a mixture thereof.

The negative electrode and the positive electrode may be manufactured by a method including mixing an active material, a conductive material, and a binder into an active material composition and coating the composition on a current collector. The electrode manufacturing method is well known, and thus is not described in detail in the present specification. The solvent includes N-methylpyrrolidone and the like, but is not limited thereto.

The separator may include any materials commonly used in the conventional lithium battery as long as separating the negative electrode from the positive electrode and providing a transporting passage for lithium ions. In other words, the separator may have a low resistance to ion transportation and an excellent impregnation for an electrolyte. For example, it may be selected from glass fiber, polyester, TEFLON (tetrafluoroethylene), polyethylene, polypropylene, polytetrafluoroethylene (PTFE), or a combination thereof. It may have a form of a non-woven fabric or a woven fabric.

For example, a polyolefin-based polymer separator such as polyethylene, polypropylene or the like is mainly used for a lithium ion battery. In order to ensure the heat resistance or mechanical strength, a coated separator including a ceramic component or a polymer material may be used. Selectively, it may have a mono-layered or multi-layered structure.

Hereinafter, the above aspects of the present disclosure are illustrated in more detail with reference to examples. However, these the present disclosure is not limited to the examples provided herein.

Manufacture of Rechargeable Lithium Battery Cell

Example 1

An electrolyte was prepared by mixing ethylene carbonate (EC): ethylmethyl carbonate (EMC): dimethyl carbonate (DMC) in a volume ratio of 3:5:2 and adding 0.9M $LiPF_6$ to the mixed solvent and then, 0.2 wt % of $LiBF_4$, 3 wt % of fluoroethylene carbonate (FEC), and 0.1 wt % of 1,3,5-Triallyl-1,3,5-triazine-2,4,6(1H, 3H, 5H)-trione (hereinafter, TATT) thereto.

Positive electrode slurry was prepared by mixing 90 wt % of $LiCoO_2$ as a positive active material, 5 wt % of polyvinylidene fluoride as a binder, and 5 wt % of acetylene black as a conductive material and adding N-methyl-2-pyrrolidone thereto. The positive electrode slurry was coated on an aluminum film and then, dried and compressed, manufacturing a positive electrode.

Negative electrode slurry was prepared by mixing 97 wt % of graphite as a negative active material, 2.5 wt % of polyvinylidene fluoride as a binder, conductive material, and 0.5 wt % of acetylene black and adding N-methyl-2-pyrrolidone thereto. The negative electrode slurry was coated on a copper foil and then, dried and compressed at 120° C. in a vacuum oven, manufacturing a negative electrode.

Subsequently, a 25 μm-thick porous polyethylene separation membrane as a separator was interposed between the positive and negative electrodes to manufacture an electrode assembly, and the electrode assembly was inserted into a cylindrical can. The can was sealed after inserting the electrolyte thereinto, manufacturing a rechargeable lithium battery cell.

Example 2

A rechargeable lithium battery cell was manufactured according to the same method as Example 1 except for preparing the electrolyte by further adding 0.2 wt % of TATT thereto.

Example 3

A rechargeable lithium battery cell was manufactured according to the same method as Example 1 except for preparing the electrolyte by further adding 0.3 wt % of TATT thereto.

Example 4

A rechargeable lithium battery cell was manufactured according to the same method as Example 1 except for preparing the electrolyte by using 1,3-diallyl-1,3,5-triazine-2,4,6(1H,3H,5H)-trione represented by the Chemical Formula A instead of the TATT.

[Chemical Formula A]

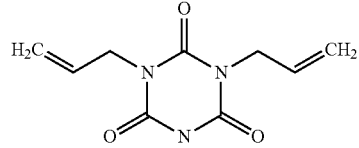

Example 5

A rechargeable lithium battery cell was manufactured according to the same method as Example 1 except for preparing the electrolyte by using 1-allyl-1,3,5-triazine-2,4,6(1H,3H,5H)-trione represented by the Chemical Formula B instead of the TATT.

[Chemical Formula B]

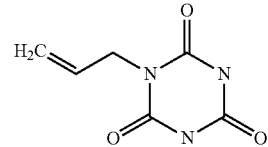

Comparative Example 1

A rechargeable lithium battery cell was manufactured according to the same method as Example 1 except for preparing the electrolyte by adding no TATT thereto.

Evaluation Example 1: Room Temperature Cycle-Life Characteristics

Cycle-life characteristics of the rechargeable lithium battery cells according to Examples 1 to 3 and Comparative Example 1 were evaluated at room temperature, and the results are provided in the following Table 1 and FIG. 1.

The rechargeable lithium battery cells were 500 cycles charged and discharged at 1.2 C/1.5 C through rated-charge and rated-discharge by every 50 cycles, and rated discharge capacity of the rechargeable lithium battery cells was measured.

TABLE 1

| | Electrolyte composition | 500 cycle capacity retention at room temperature (%) |
|---|---|---|
| Example 1 | EC/EMC/DMC (3/5/2 by vol) with 0.9M $LiPF_6$ + $LiBF_4$ 0.2 wt % + FEC 3 wt % + TATT 0.1 wt % | 73.7 |
| Example 2 | EC/EMC/DMC (3/5/2 by vol) with 0.9M $LiPF_6$ + $LiBF_4$ 0.2 wt % + FEC 3 wt % + TATT 0.2 wt % | 76.7 |
| Example 3 | EC/EMC/DMC (3/5/2 by vol) with 0.9M $LiPF_6$ + $LiBF_4$ 0.2 wt % + FEC 3 wt % + TATT 0.3 wt % | 78.4 |
| Comparative Example 1 | EC/EMC/DMC (3/5/2 by vol) with 0.9M $LiPF_6$ + $LiBF_4$ 0.2 wt % + FEC 3 wt % | 66.2 |

Referring to Table 1 and FIG. 1, the rechargeable lithium battery cell of Examples 1 to 3 showed a remarkably high cycle-life maintenance rate at room temperature compared with the one of Comparative Example 1, and the reason is that the electrolyte is suppressed from a deterioration reaction with an electrode by a film formed by the electrolyte with the electrode in Example.

While this disclosure has been described in connection with what is presently considered to be practical example embodiments, it is to be understood that the embodiments are not limited to the disclosed embodiments, but, on the contrary, is intended to cover various modifications and equivalent arrangements included within the spirit and scope of the appended claims.

What is claimed is:

1. An electrolyte for a rechargeable lithium battery, comprising
a lithium salt,
a non-aqueous organic solvent, and
an additive represented by the following Chemical Formula 1:

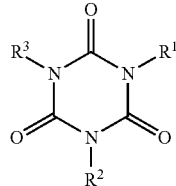

Chemical Formula 1 wherein, $R^1$ to $R^3$ are the same or different, and are independently hydrogen, a substituted or unsubstituted C1 to C10 alkyl group, a substituted or unsubstituted C1 to C10 alkenyl group, a substituted or unsubstituted C3 to C20 cycloalkyl group, a substituted or unsubstituted C3 to C20 cycloalkenyl group, a substituted or unsubstituted C6 to C30 aryl group, or a substituted or unsubstituted C2 to C30 heteroaryl group, and at least one of $R^1$ to $R^3$ is a substituted or unsubstituted C1 to C10 alkenyl group, or a substituted or unsubstituted C3 to C20 cycloalkenyl group,
wherein the additive represented by the above Chemical Formula 1 is included in an amount of about 0.01 wt % to about 3 wt % based on the total amount of the electrolyte for a rechargeable lithium battery,
wherein the electrolyte comprises fluoroethylene carbonate in an amount of about 0.1 wt % to about 10 wt % based on the total amount of the electrolyte for a rechargeable lithium battery, and
wherein the electrolyte comprises lithium tetrafluoro borate in an amount of about 0.01 wt % to about 2 wt % based on the total amount of the electrolyte for the rechargeable lithium battery.

2. The electrolyte for a rechargeable lithium battery of claim 1, wherein, at least one of $R^1$ to $R^3$ is a substituted or unsubstituted C1 to C2 alkenyl group.

3. The electrolyte for a rechargeable lithium battery of claim 1, wherein the lithium salt comprises $LiPF_6$, $LiBF_4$, $LiSbF_6$, $LiAsF_6$, $LiC_4F_9SO_3$, $LiClO_4$, $LiAlO_2$, $LiAlCl_4$, $LiN(C_xF_{2x+1}SO_2)(C_yF_{2y+1}SO_2)$, x and y are natural numbers, LiCl, LiI, or a combination thereof.

4. The electrolyte for a rechargeable lithium battery of claim 1, wherein a concentration of the lithium salt is about 0.1 M to about 2.0 M.

5. The electrolyte for a rechargeable lithium battery of claim 1, wherein the non-aqueous organic solvent comprises a carbonate-based, ester-based, ether-based, ketone-based, alcohol-based, aprotic solvent or a combination thereof.

6. A rechargeable lithium battery comprising:
a positive electrode,
a negative electrode and,
an electrolyte comprising:
a lithium salt,
a non-aqueous organic solvent, and
an additive represented by the following Chemical Formula 1:

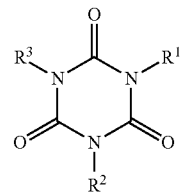

Chemical Formula 1 wherein, $R^1$ to $R^3$ are the same or different, and are independently hydrogen, substituted or unsubstituted C1 to C10 alkyl group, a substituted or unsubstituted C1 to C10 alkenyl group, a substituted or unsubstituted C3 to C20 cycloalkyl group, a substituted or unsubstituted C3 to C20 cycloalkenyl group, a substituted or unsubstituted C6 to C30 aryl group, or a substituted or unsubstituted C2 to C30 heteroaryl group, and at least one of $R^1$ to $R^3$ is a substituted or unsubstituted C1 to C10 alkenyl group, or a substituted or unsubstituted C3 to C20 cycloalkenyl group,
wherein the additive represented by the above Chemical Formula 1 is included in an amount of about 0.01 wt % to about 3 wt % based on the total amount of the electrolyte for a rechargeable lithium battery,
wherein the electrolyte comprises fluoroethylene carbonate in an amount of about 0.1 wt % to about 10 wt % based on the total amount of the electrolyte for a rechargeable lithium battery, and
wherein the electrolyte comprises lithium tetrafluoro borate in an amount of about 0.01 wt % to about 2 wt % based on the total amount of the electrolyte for the rechargeable lithium battery.

7. The rechargeable lithium battery of claim 6, wherein, at least one of $R^1$ to $R^3$ is a substituted or unsubstituted C1 to C2 alkenyl group.

8. The rechargeable lithium battery of claim 6, wherein the lithium salt comprises $LiPF_6$, $LiBF_4$, $LiSbF_6$, $LiAsF_6$, $LiC_4F_9SO_3$, $LiClO_4$, $LiAlO_2$, $LiAlCl_4$, $LiN(C_xF_{2x+1}SO_2)(C_yF_{2y+1}SO_2)$, x and y are natural numbers, LiCl, LiI, or a combination thereof.

9. The rechargeable lithium battery of claim 6, wherein a concentration of the lithium salt is about 0.1 M to about 2.0 M.

10. The rechargeable lithium battery of claim 6, wherein the non-aqueous organic solvent comprises ethylene carbonate, ethylmethyl carbonate, dimethyl carbonate, diethyl carbonate, dipropyl carbonate, methylpropyl carbonate, ethylpropyl carbonate, propylene carbonate, butylene carbonate, or a combination thereof.

* * * * *